United States Patent [19]

Fonseca

[11] Patent Number: 5,083,829
[45] Date of Patent: Jan. 28, 1992

[54] PICKUP TRUCK STORAGE TRUNK AND AIR FOIL

[76] Inventor: Eluterio L. Fonseca, 4533 E. Belmont, Fresno, Calif. 93702

[21] Appl. No.: 586,269

[22] Filed: Sep. 21, 1990

[51] Int. Cl.⁵ .............................................. B60R 9/00
[52] U.S. Cl. .................. 296/37.6; 296/180.1; 224/42.42
[58] Field of Search ............................ 296/37.6, 180.1; 224/316, 42.42; 411/171

[56] References Cited

U.S. PATENT DOCUMENTS

| | | | |
|---|---|---|---|
| 3,116,816 | 1/1964 | Johnson | 411/171 |
| 4,451,075 | 5/1984 | Canfield | 296/180.1 |
| 4,506,870 | 3/1985 | Penn | 296/180.1 |
| 4,585,263 | 4/1986 | Hesner | 296/180.1 |
| 4,938,398 | 7/1990 | Hallsen | 296/37.6 |

Primary Examiner—Robert R. Song
Attorney, Agent, or Firm—Mark D. Miller

[57] ABSTRACT

A wedge-shaped storage compartment having a large opening at the back, designed to be removably mounted in the rear of a pickup truck bed. The storage compartment is mounted so that the tailgate of the pickup truck serves as the lockable door for the storage compartment. The locking mechanism utilizes the existing mechanism of the pickup truck tailgate. Thick rubber stripping around the opening in the storage compartment provides an airtight, watertight seal with the tailgate itself.

10 Claims, 3 Drawing Sheets

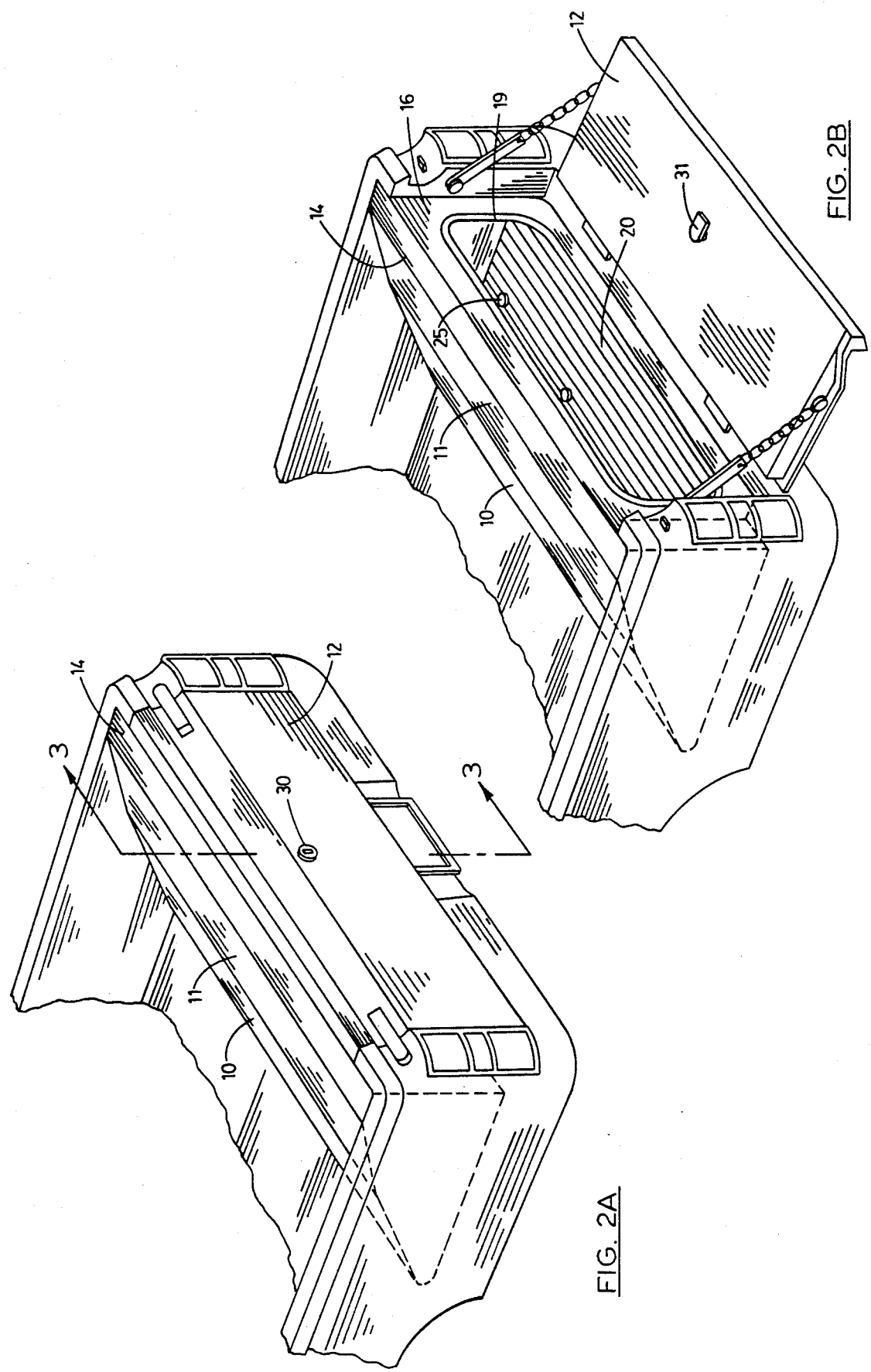

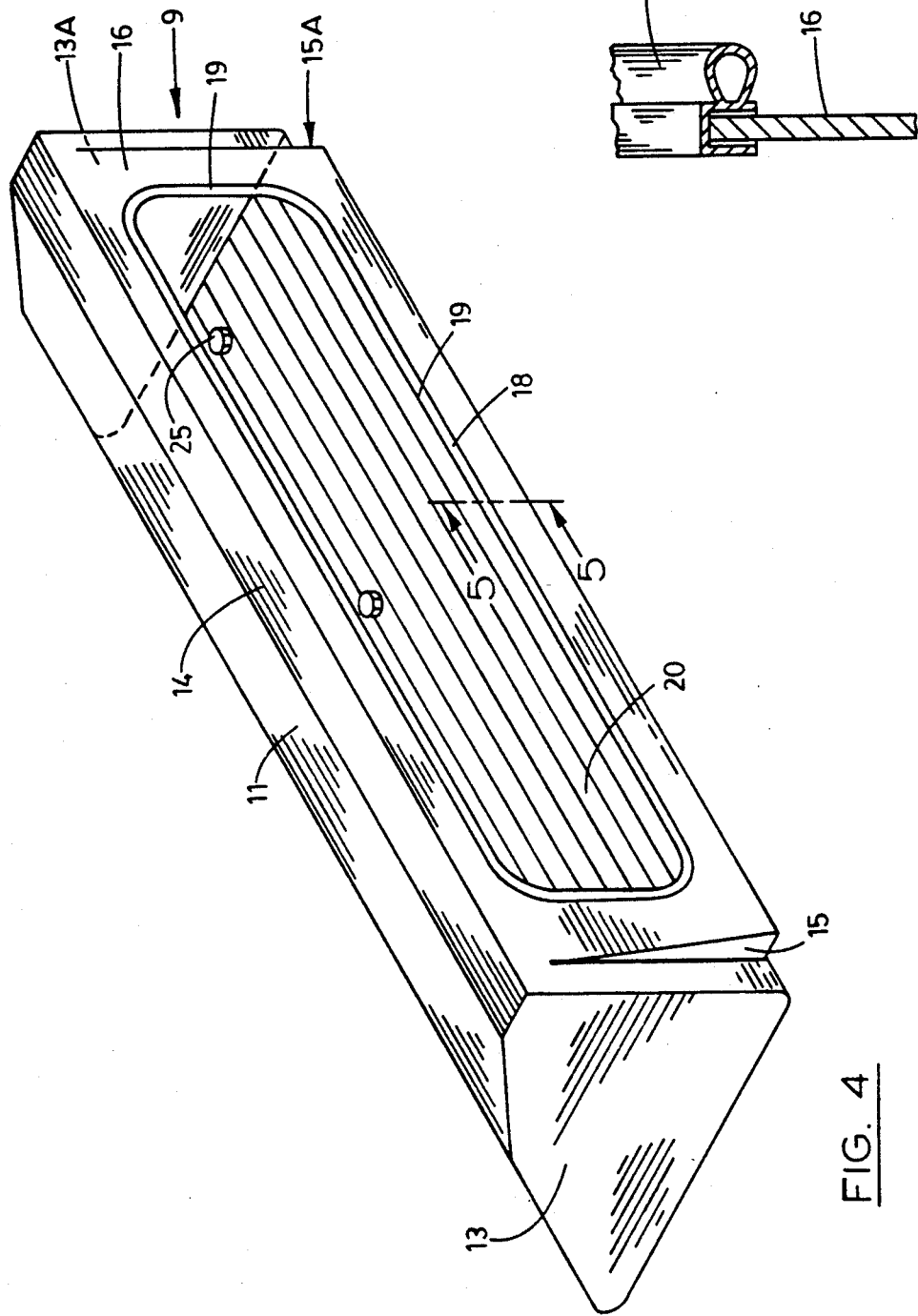

PICKUP TRUCK STORAGE TRUNK AND AIR FOIL

BACKGROUND OF THE INVENTION

The present invention relates to storage units for pickup trucks and other similar flatbed vehicles. The present invention also relates to air foils used to reduce air drag on moving vehicles.

One of the most common problems encountered by pickup truck owners is having suitable closable storage space outside of the cab of the pickup truck. In order to address this problem, a wide variety of storage compartments have been introduced in the prior art which may be placed immediately behind the cab or along the sides of the pickup truck bed. Such bed mounted storage boxes are difficult to access, requiring the user to crawl across the bed of the pickup truck to reach them.

The side mounted storage compartments, while providing easy access, are not practical for the every day pickup truck user, but are more suited for construction contractors, carpenters, tradesmen and the like. All of the storage devices known in the prior art simply add more bulk, and hence more drag, to the pickup truck itself.

It is also widely known that the tailgate of a common pickup truck produces considerable drag as the truck is traveling forward, and that by opening the tailgate, drag is reduced and gas mileage is improved. The storage compartment of the present invention utilizes the existing tailgate of a common pickup truck, and provides a sloping, angular surface that is tapered downward from the top of the tailgate to the bed of the pickup truck. This sloping surface improves the aerodynamics of the pickup truck which, in turn, improves the truck's gas mileage.

It is therefore a primary object of the present invention to provide a simple, easily-accessible storage compartment adapted for mounting between the wheel wells and the tailgate of a pickup truck bed.

It is a further object of the present invention to provide a secure and airtight storage compartment for a pickup truck bed, which can be easily removed in the event the full length of the pickup truck bed is needed.

It is a further object of the present invention to provide a new and improved truck storage compartment having a rear end opening adapted to be opened and closed by a conventional pickup truck tailgate.

It is a further important object of the present invention to provide a pickup truck storage compartment that is aerodynamically designed to reduce unnecessary drag and turbulence in the pickup truck bed while the pickup truck is moving.

SUMMARY OF THE INVENTION

The present invention is principally comprised of a wedge-shaped shell having a wide opening across the rear. The shell may be bolted or otherwise attached to the rear of the pickup truck bed between the wheel wells and the tailgate. It is designed as an add on to any existing pickup truck, and utilizes the existing tailgate of the pickup truck as a "door" to provide access to the interior of the shell.

The shell itself may be made in variable sizes in order to fit snugly into different pickup truck beds. The locking mechanism on the tailgate is incorporated into a new mechanism which locks the tailgate directly into the shell itself. A rubber mat is provided in the floor of the shell for stability, and rubber stripping is provided around the perimeter of the opening in the rear of the shell so as to make snug airtight and watertight contact with the tailgate when closed.

To install the shell, it is simply bolted or otherwise attached to the bed of the pickup truck, and a lock mechanism is added to the existing closing mechanism of the tailgate. The tailgate then serves as the access door to the shell which may be used to store groceries, tools, dry goods, spare parts, etc. The shell may be easily unbolted and removed on those occasions when the entire length of the pickup truck bed is needed.

BRIEF DESCRIPTION OF THE DRAWINGS

FIG. 2A is a perspective view of the invention in place at the rear of a pickup truck bed, with the tailgate closed.

FIG. 2B is a perspective view of the invention in place at the rear of a pickup truck bed, with the tailgate open.

FIG. 4 is a stand-alone perspective view of the invention.

FIG. 5 is a cutaway view along lines 5—5 of FIG. 4 showing detail of the rubber stripping provided at the opening.

DETAILED DESCRIPTION OF THE DRAWINGS

Figure 1:
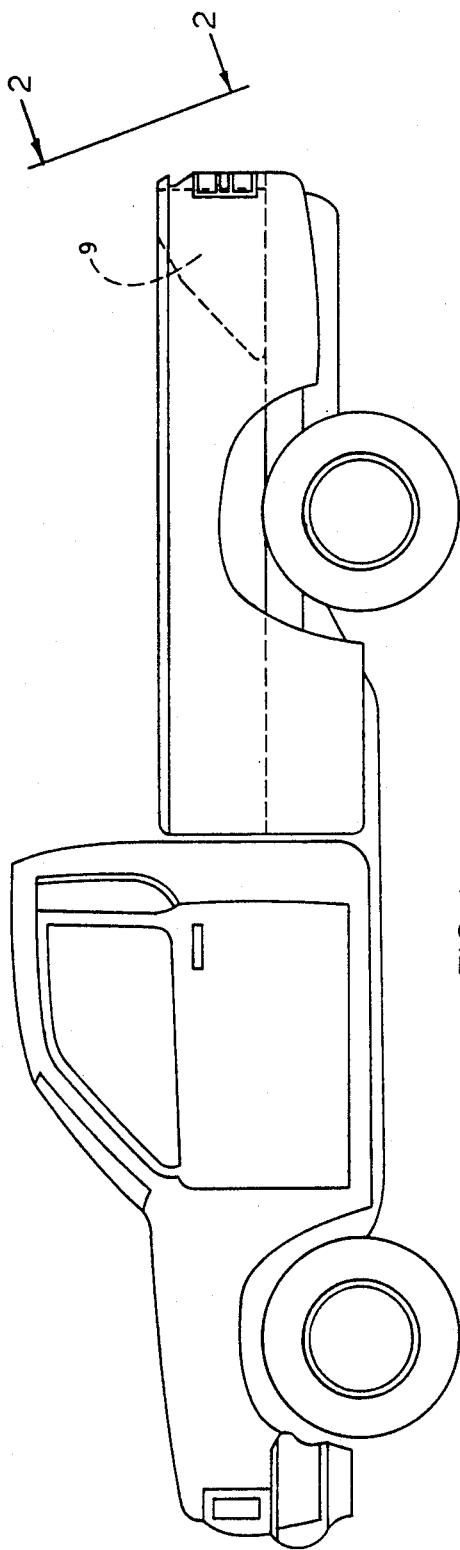
FIG. 1 is a side view of the present invention showing its location in the rear of a pickup truck bed.

Referring to the drawings wherein like reference characters designate like or corresponding parts throughout the several views, and referring particularly to FIG. 2A and FIG. 2B, it is seen that the invention, generally 9, has a slightly sloped front wall 10, and a more severely sloped front wall 11 which serve as the air foil to reduce drag when the pickup truck is in motion. The shell has a top portion 14 and two sides 13 and 13A. A large opening 19 is located in the center of the rear section 16 of the shell 9. The rear section 16 protrudes out at the bottom at the areas designated 15 and 15A in order to provide a snug fit against the tailgate 12 of the pickup truck. Rubber stripping 18 is placed around the entire perimeter of the opening 19. A rubber mat 20 is placed in the bottom of the interior of the shell to provide stability to objects placed therein.

Referring to FIG. 1, it can be seen that as the pickup truck travels in a forward direction, air turbulence is avoided in the vicinity of the invention because of the sloping front walls 10 and 11 which act as an air foil.

Figure 3:
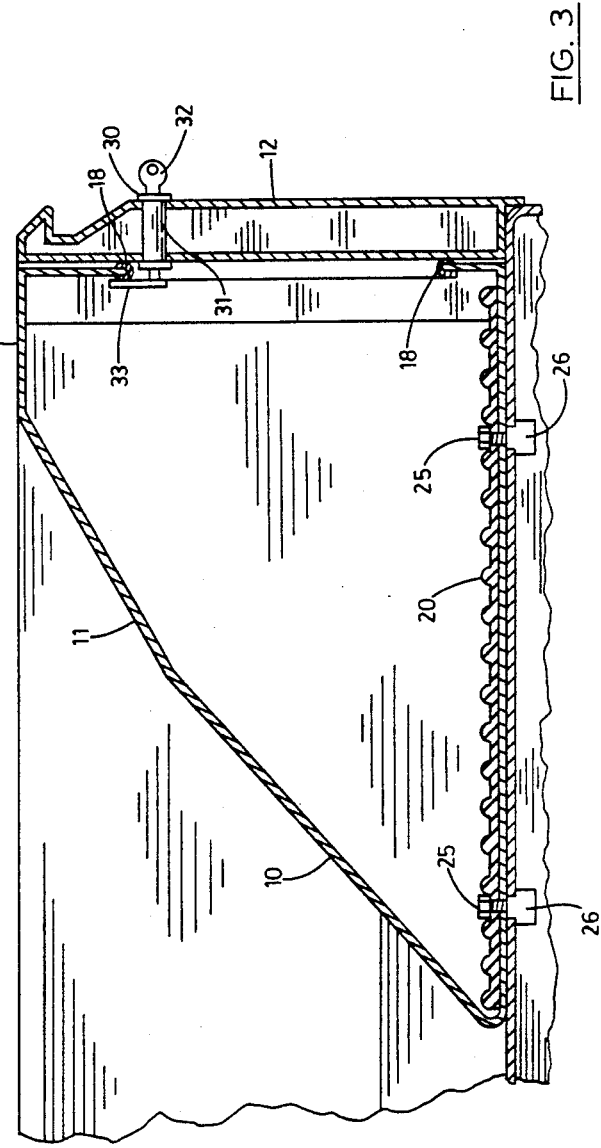
FIG. 3 is a cutaway view of the invention along lines 3—3 of FIG. 2A.

The lock mechanism 31 shown in FIG. 3 is fastened into the tailgate door 12, and attached to the existing tailgate closing/locking mechanism. Region 30 of the locking mechanism is mounted flush against tailgate 12. Key 32 is used to open and close the locking mechanism. Tab 33 holds the lock mechanism 31 snugly against the shell 9.

A nut-sert device 26 is used to mount the invention in the floor of the pickup truck bed (see FIG. 3). Two or more of these nuts 26 are permanently placed in the pickup truck bed. Two or more holes corresponding to the locations of the nut-serts 26 are cut into the bottom of the shell 9, so that mounting bolts 25 may be placed through said openings and fastened securely to each such nut-sert 26. The shell 9 may be removed by simply removing the bolts 25 from the permanently-mounted nut-sert 26.

Special stripping 18 is provided around the perimeter of opening 19 so that when the tailgate is closed, it presses firmly against such stripping to provide an airtight and watertight seal.

DESCRIPTION OF THE PREFERRED EMBODIMENTS

In the preferred embodiment, the present invention may be made of fiberglass, steel, or other suitable material. The exact size of the invention may be adjusted for different sized pickup trucks. This includes adjusting the angles of surfaces 10 and 11 as well as 15 and 15A. A larger shell may be created by extending surface 14. The stripping 18 around the perimeter of opening 19 should be thick but flexible so as to compensate for variations in the surface of the tailgate of the truck itself. The invention is designed to be placed in the rear of the pickup truck bed for use in conjunction with the pickup truck tailgate. It should therefore not be any taller than the tailgate itself.

It is to be understood that variations and modifications of the present invention may be made without departing from the scope thereof. It is also to be understood that the present invention is not to be limited by the specific embodiments disclosed herein, but only in accordance with appended claims when read in light of the foregoing specification.

I claim:

1. A pickup truck storage trunk and air foil comprising:
   a. a wedge shaped shell designed to fit inside the bed of a pickup truck having an angularly sloped front and a large opening in the rear wherein the shell is placed at the rear of the bed of a pickup truck so that the large opening fits flush against the tailgate of the pickup truck when it is closed, and the large opening is exposed when the tailgate is open;
   b. a means for attaching said shell to the bed of a pickup truck; and
   c. weather stripping provided around the perimeter of the large opening so as to provide a snug fit against the tailgate of the pickup truck when said tailgate is closed.

2. The invention described in claim 1 wherein a locking mechanism is added to the existing closing/locking mechanism of the tailgate of the pickup truck in order to allow closure of both the existing tailgate mechanism and the shell at the same time.

3. The invention described in claim 1 wherein no less than four nut means are permanently mounted in the rear floor of the pickup truck bed into which an identical number of bolt means may be placed for use in removably securing the shell to the floor of the pickup truck bed.

4. A pickup truck storage trunk and airfoil adapted for mounting between the wheel wells and the tailgate of a pickup truck, comprising:
   a. a wedge-shaped shell defined by a pair of generally vertical side walls; a planar generally horizontal base connected to said side walls; an aerodynamically configured front wall having an upper and lower panel, each such panel being connected to the vertical side walls, said lower panel being connected to said base; a top wall connected to said side walls and said upper panel; and a rear panel connected to said base, side walls and top wall, said rear panel having a large opening therein;
   b. means for attaching said shell to the bed of a pickup truck; and
   c. weather stripping provided around the perimeter of the large opening so as to provide a snug fit against the tailgate of the pickup truck when said tailgate is closed.

5. The invention described in claim 4 wherein a locking mechanism is added to the existing closing/locking mechanism of the tailgate of the pickup truck in order to allow closure of both the existing tailgate mechanism and the shell at the same time.

6. The invention described in claim 4 wherein no less than two nut means are permanently mounted in the rear floor of the pickup truck bed into which an identical number of bolt means may be placed for use in removably securing the shell to the floor of the pickup truck bed.

7. The invention described in claim 4 wherein a rubber mat is provided in the floor of the shell.

8. The invention described in claim 1 wherein a rubber mat is provided in the floor of the shell.

9. The invention described in claim 1 wherein the center of the rear wall of said shell is extended outward in a gradual slope increasing from top to bottom so that it is flush with the pickup truck tailgate when the tailgate is closed.

10. The invention described in claim 4 wherein the center of the rear wall of said shell is extended outward in a gradual slope increasing from top to bottom so that it is flush with the pickup truck tailgate when the tailgate is closed.

* * * * *